(12) United States Patent
Ikezawa

(10) Patent No.: US 7,974,870 B2
(45) Date of Patent: Jul. 5, 2011

(54) SALES ACTIVITY MANAGEMENT SYSTEM, SERVER DEVICE, RECORDING MEDIUM AND COMPUTER DATA SIGNAL

(75) Inventor: Toyoji Ikezawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1148 days.

(21) Appl. No.: 10/812,413

(22) Filed: Mar. 30, 2004

(65) Prior Publication Data

US 2004/0215504 A1    Oct. 28, 2004

(30) Foreign Application Priority Data

Mar. 31, 2003   (JP) .................................. 2003-093245
Mar. 30, 2004   (JP) .................................. 2004-098691

(51) Int. Cl.
*G06Q 10/00* (2006.01)
(52) U.S. Cl. ............. 705/7.38; 705/7.12; 705/7.22; 705/304; 705/346
(58) Field of Classification Search .................. None
See application file for complete search history.

(56) References Cited

U.S. PATENT DOCUMENTS

| | | | | |
|---|---|---|---|---|
| 5,930,764 | A | * | 7/1999 | Melchione et al. .............. 705/10 |
| 6,070,149 | A | * | 5/2000 | Tavor et al. .................... 705/26.7 |
| 7,155,424 | B2 | * | 12/2006 | Ikezawa et al. .................... 707/1 |
| 7,340,410 | B1 | * | 3/2008 | Vaillancourt et al. ............ 705/10 |
| 7,596,509 | B1 | * | 9/2009 | Bryson ........................... 705/27.2 |
| 7,711,598 | B2 | * | 5/2010 | Perkowski ................. 705/14.51 |
| 7,904,333 | B1 | * | 3/2011 | Perkowski .................... 705/14.4 |
| 2002/0010674 | A1 | * | 1/2002 | Kent ................................ 705/37 |
| 2002/0046157 | A1 | * | 4/2002 | Solomon ......................... 705/37 |
| 2002/0052814 | A1 | * | 5/2002 | Ketterer .......................... 705/35 |
| 2002/0174008 | A1 | * | 11/2002 | Noteboom ....................... 705/11 |
| 2002/0178127 | A1 | * | 11/2002 | Byde et al. ....................... 705/80 |
| 2002/0194081 | A1 | * | 12/2002 | Perkowski ....................... 705/26 |
| 2002/0198791 | A1 | * | 12/2002 | Perkowski ....................... 705/26 |

(Continued)

FOREIGN PATENT DOCUMENTS

JP          2000-222486 A         8/2000

(Continued)

OTHER PUBLICATIONS

Sales Force Automation: How to Set Up a Pilot Program Dulaney, Ken Sales and Marketing Management; Feb. 1990; 142, 2; ABI/INFORM Global p. 60.*

(Continued)

*Primary Examiner* — Romain Jeanty
*Assistant Examiner* — Gurkanwaljit Singh
(74) *Attorney, Agent, or Firm* — Morrison & Foerster LLP

(57) ABSTRACT

A server device includes an activity content evaluation unit, an activity pattern analyzing unit, an evaluation report creating unit, and an evaluation report sending unit, and is connected to an activity management information DB, which has activity management information for managing activity content of each salesperson registered. The server device evaluates the activity content of each salesperson based on the activity management information in the activity management information DB, and creates evaluation report information from the evaluation results. The server device analyzes the activity pattern of salespeople that have a number equal to or higher than a predetermined number of agreements reached in sales negotiations, based on the activity management information in the activity management information DB, generates advise information towards each salesperson from the analysis, and sends the evaluation report information, adding the generated advise information thereto, to a terminal device of the salesperson.

10 Claims, 9 Drawing Sheets

U.S. PATENT DOCUMENTS

| | | | |
|---|---|---|---|
| 2003/0009392 A1* | 1/2003 | Perkowski | 705/26 |
| 2003/0195806 A1* | 10/2003 | Willman et al. | 705/14 |
| 2004/0186765 A1* | 9/2004 | Kataoka | 705/10 |
| 2004/0210479 A1* | 10/2004 | Perkowski et al. | 705/14 |
| 2004/0215504 A1* | 10/2004 | Ikezawa | 705/11 |
| 2004/0220884 A1* | 11/2004 | Khan | 705/80 |
| 2004/0254846 A1* | 12/2004 | Byde | 705/26 |
| 2004/0254847 A1* | 12/2004 | Preist et al. | 705/26 |
| 2005/0004838 A1* | 1/2005 | Perkowski et al. | 705/14 |
| 2005/0251448 A1* | 11/2005 | Gropper | 705/14 |
| 2007/0208608 A1* | 9/2007 | Amerasinghe et al. | 705/10 |

FOREIGN PATENT DOCUMENTS

| | | | |
|---|---|---|---|
| JP | 2001-250022 A | 9/2001 | |
| JP | 2001-297184 A | 10/2001 | |
| JP | 2002-063336 A | 2/2002 | |
| JP | 2002-279159 | 9/2002 | |

OTHER PUBLICATIONS

Software Agents for Environmental Scanning in Electronic Commerce Shuhua Liu; Efraim Turban; Matthew K.O. Lee Information Systems Frontiers; Jan. 2000; 2, 1; ABI/INFORM Global p. 85.*

Agent-Based Supply Chain Integration Mark E. Nissen Information Technology and Management; Jul. 2001; 2, 3; ABI/INFORM Global p. 289.*

Factors that enhance consumer trust in human-computer interaction: An examination of interface factors and the moderating influences by Lee, Eun-Ju, Ph.D., The University of Tennessee, 2002 , 233 pages.*

The Effects of Multimedia Communication on Web-Based Negotiation Yufei Yuan; Milena Head; Mei Du Group Decision and Negotiation; Mar. 2003; 12, 2; ABI/INFORM Global p. 89.*

The wireless future; [Life and Times, 2 Edition] New Straits Times. Kuala Lumpur: Nov. 22, 2000. p. 4.*

The automated sales force Dulaney, Ken American Demographics; Oct. 1996; ABI/INFORM Global p. 56.*

Feb. 1, 2003 "Achievement of Workflow Coordinated With an Existing Mission-Critical System As Well As Sharing Knowledge," *User Application Case. Notes/Domino Magazine.* Softbank Publishing Co., Ltd. 76:36-40.

Japanese Office Action, dated Jan. 13, 2009, directed to counterpart Japanese Patent Application No. 2004-098691; 3 pages.

* cited by examiner

FIG. 5

| | | | | TOKYO R | |
|---|---|---|---|---|---|
| 51 | SALES COMPANY NAME | | | TOKYO R | |
| 52 | DEPARTMENT NAME | | | FIRST DEP. | SECOND DEP. |
| 53 | NUMBER OF SALESPEOPLE TOTAL | | | 34 | 19 |
| 54 | NUMBER OF REGISTERED ITEMS | ONGOING ITEMS (2002/2/2) | TOTAL PER PERSON | 7 0.2 | 7 0.2 |
| | | LOW | LEVEL 1 ITEMS PER PERSON | 5 0.1 | 60 3.2 |
| | | | LEVEL 2 ITEMS PER PERSON | 0 0.0 | 0 0.0 |
| | | | LEVEL 3 ITEMS PER PERSON | 0 0.0 | 1 0.1 |
| | | MEDIUM | LEVEL 4 ITEMS PER PERSON | 0 0.0 | 1 0.1 |
| | | | LEVEL 5 ITEMS PER PERSON | 0 0.0 | 3 0.2 |
| | | | LEVEL 6 ITEMS PER PERSON | 0 0.0 | 1 0.1 |
| | | HIGH | LEVEL 7 ITEMS PER PERSON | 2 0.1 | 6 0.3 |
| | | | LEVEL 8 ITEMS PER PERSON | 0 0.0 | 2 0.1 |
| | | | LEVEL 9 ITEMS PER PERSON | 0 0.0 | 2 0.1 |
| 55 | PRODUCT SPECIFICATION INFORMATION | | CREATION RATE | 0% | 4% |
| 56 | WRITTEN ESTIMATE INFORMATION | | CREATION RATE | 0% | 0% |
| 57 | ACTIVITY TIME INFORMATION | | ACTIVITY TIME (PER DAY) | 5.1 | 5.6 |

FIG. 6

EVALUATION REPORT (SALESPERSON : (ONE'S DIVISION))

| CLASSIFICATION | RANKING | EVALUATION RESULTS | ADVISE INFORMATION |
|---|---|---|---|
| NUMBER OF REGISTERED SALES NEGOTIATIONS | B | NUMBER OF REGISTERED SALES NEGOTIATIONS IS LOW REGISTERED NUMBER : 5 STANDARD VALUE : 7 | ACTIVELY CARRY OUT AROUSING INTERESTS WHEN MAKING CUSTOMER CALLS, AND DEVELOP TO SALES NEGOTIATION. CONCRETE ACTIVITY PATTERN IS···· |
| ··· | ··· | ··· | ··· |

PRIORITY CUSTOMER WHOM YOU SHOULD VISIT
(SALES NEGOTIATION PROGRESS LEVEL EQUAL TO OR HIGHER THAN 7)

| CUSTOMER NAME | PRODUCT NAME | UNIT COST | AMOUNT | ESTIMATE PROCEEDS |
|---|---|---|---|---|
| ABC LTD. | PPC 001 | ××× YEN | 2 | ××× YEN |
| ··· | ··· | ··· | ··· | ··· |

FIG. 7

EVALUATION REPORT (SALESPERSON : ONE'S DIVISION)

| CLASSIFICATION | RANKING | EVALUATION RESULTS | ADVISE INFORMATION |
|---|---|---|---|
| NUMBER OF REGISTERED SALES NEGOTIATIONS | B | NUMBER OF REGISTERED SALES NEGOTIATIONS IS LOW REGISTERED NUMBER : 5 STANDARD VALUE : 7 | ACTIVELY CARRY OUT AROUSING INTERESTS WHEN MAKING CUSTOMER CALLS, AND DEVELOP TO SALES NEGOTIATION. CONCRETE ACTIVITY PATTERN IS ····· |
| ... | ... | ... | ... |

PRIORITY CUSTOMER WHOM YOU SHOULD VISIT
(SALES NEGOTIATION PROGRESS LEVEL EQUAL TO OR HIGHER THAN 7)

| CUSTOMER NAME | PRODUCT NAME | UNIT COST | AMOUNT | ESTIMATE PROCEEDS |
|---|---|---|---|---|
| ABC LTD. | PPC 001 | x x x YEN | 2 | x x x YEN |
| ... | ... | ... | ... | ... |

MANAGER COMMENT

WHEN MAKING CUSTOMER CALLS·····

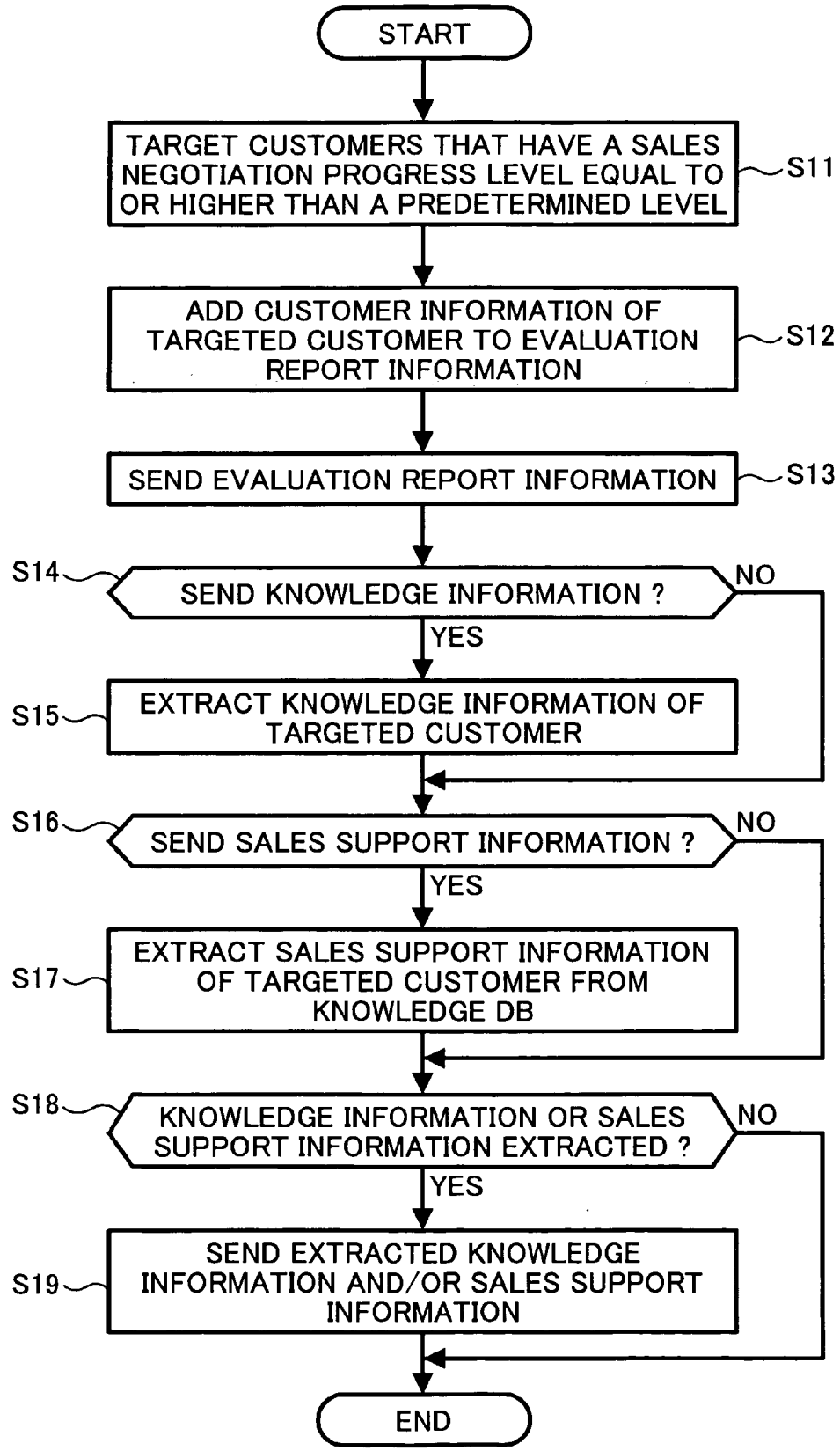

SALES ACTIVITY MANAGEMENT SYSTEM, SERVER DEVICE, RECORDING MEDIUM AND COMPUTER DATA SIGNAL

BACKGROUND OF THE INVENTION

1. Field of the Invention

The present invention relates to a sales activity management system, etc., for managing sales activity utilizing IT (Information Technology).

2. Description of the Related Art

It is necessary for managers who carry out managing of sales activity in a company, to consistently comprehend steps in each sales negotiation, and to give adequate instructions to the salespeople. Conventionally, content of activity of the salespeople (for example, calling activity to a customer), and results are reported to the manager by a daily report. Managers manage sales activities using the daily report and customer files. In this way, in a case where management of sales activity is carried out using documents, it is difficult for the manager to acquire adequate and objective information, because in most cases, the description content of the document differs according to the salesperson. Also, it is difficult to comprehend sales negotiation as a lump, in a marketing division, and to comprehend each sales negotiation from a predetermined dimension.

Especially in a sales negotiation, it is important to carry out each step that structures a process until an agreement is reached in the sales negotiation, at an adequate timing by an adequate content. However, it can be said that information concerning the process of the sales negotiation concerning each customer is not fully comprehended and managed by the manager.

In recent years, SFA (Sales Force Automation) system that makes possible, innovation of general service including sales activities, etc, is becoming common. By making full use of various IT (Information Technology) in the SFA system, effects equal to or more than rationalization of business affairs in marketing divisions, can be obtained. By the improvement in mobile computing technology, necessary business transaction information can be obtained immediately, even at a customer's destination, and a system of going straight to a destination and going straight home can be realized. The salespeople can carry out effective sales activity and improve customer satisfaction by using the SFA system.

For example, a system that accumulates management knowledge that the managers have as community property of an entire company, and makes possible effective employment of this knowledge, is disclosed in for example, Unexamined Japanese Patent Application KOKAI Publication No. 2002-279159, as a management system using the SFA system.

However, management towards salespeople differs greatly according to the skill of the manager, and in most cases, accurate instructions at a high level do not prevail. Also, in carrying out management, managers tend to rely on their experience and senses. Furthermore, what kind of process should be adopted in sales activity, relies on each salesperson's decision. In this way, there are cases where accurate sales activity can not be carried out depending on the skill level of the managers and the salespeople.

SUMMARY OF THE INVENTION

In consideration of the above, an object of the present invention is to provide a sales activity management system, etc., that can accurately give instructions and advise towards each salesperson in sales activity, without being influenced by a skill level of a manager.

To achieve the object, a sales activity management system according to a first aspect of the present invention comprises:
  a database that stores activity management information concerning activity content of each salesperson and sales negotiation item information concerning each sales negotiation item that each salesperson is in charge of;
  an activity content evaluation unit that evaluates the activity content of each salesperson based on at least one of the activity management information and the sales negotiation item information, registered in the database;
  an evaluation report creating unit that generates evaluation report information concerning the activity content of each salesperson, based on the evaluation results by the activity content evaluation unit; and
  an evaluation report sending unit that sends the generated evaluation report information to a terminal device of the salesperson.

The activity management information may include one of, or a plurality of data of, number of registered sales negotiations, number of customer calls made, hours of activity, number of agreements reached in sales negotiations, rate of agreements reached in sales negotiations, sales proceeds, and estimate proceeds.

The sales negotiation item information may include data of progress level of each sales negotiation item.

The sales activity management system may further comprise an activity pattern analyzing unit that extracts sales management information that has a number or rate equal to or higher than a predetermined number of registered sales negotiations or a predetermined rate of registered sales negotiations from the database, and analyzes the activity pattern of the salesperson, using the extracted sales management information, wherein:
  the evaluation report creating unit may generate advise information towards the activity content of each salesperson based on the analysis by the activity pattern analyzing unit, and add the generated advise information to the evaluation report information.

The advise information may include activity instruction information towards each salesperson.

The activity pattern analyzing unit may extract sales management information wherein a sales proceed or an estimate proceed is higher than a predetermined amount, from the database, and analyze the activity pattern of the salesperson using the extracted sales management information.

The evaluation report creating unit may rank the activity content of each salesperson, based on the evaluation results by the activity content evaluation unit.

The sales activity management system may further comprise:
  a customer database that stores customer information concerning customers; and
  a customer targeting unit that extracts sales negotiation item information wherein a sales negotiation progress level in the sales negotiation item information is equal to or higher than a predetermined level, targets the customer of sales negotiation indicated by the extracted sales negotiation item information, extracts the customer information of the targeted customer from the customer database, and adds the customer information to the evaluation report information.

The sales activity management system may further comprise a knowledge database that stores knowledge information concerning know-how and knowledge in sales activity, correlating it with customer information registered in the customer database, wherein the customer targeting unit may extract knowledge information relating to the targeted customer from the knowledge database and send the information to the terminal device, when sending the evaluation report information to the terminal device.

The sales activity management system may further comprise a knowledge database that stores sales support information including at least one of various promotional material, sales activity record, and delivery achievement concerning apparatuses, for using in sales activity, correlating it with customer information registered in the customer database, wherein the customer targeting unit may extract sales support information relating to the targeted customer from the knowledge database and send the information to the terminal device, when sending the evaluation report to the terminal device.

The sales activity management system may receive information concerning results of sales activity carried out based on the evaluation report information, from the terminal device, and register at least one of the activity management information and the sales negotiation item information, which are based on the received information, to the activity management information database.

The evaluation report information may further include data of comments input by a manager of each salesperson.

A server device according to a second aspect of the present invention comprises:

an activity content evaluation unit that evaluates the activity content of each salesperson based on at least one of the activity management information and the sales negotiation item information, registered in a database that stores activity management information concerning activity content of each salesperson and sales negotiation item information concerning each sales negotiation item that each salesperson is in charge of;

an evaluation report creating unit that generates evaluation report information concerning the activity content of each salesperson, based on the evaluation results by the activity content evaluation unit; and an evaluation report sending unit that sends the generated evaluation report information to a terminal device of the salesperson.

A computer readable recording medium according to a third aspect of the present invention, stores a program for controlling a computer to execute:

a step of evaluating activity content of each salesperson based on at least one of the activity management information and the sales negotiation item information, registered in a database that stores activity management information concerning activity content of each salesperson and sales negotiation item information concerning each sales negotiation item that each salesperson is in charge of;

a step of generating evaluation report information concerning the activity content of each salesperson, based on the evaluation results by the activity content evaluation unit; and a step of sending the generated evaluation report information to a terminal device of a salesperson.

A computer data signal embedded in a carrier wave, which represents a program for controlling a computer to execute:

a step of evaluating activity content of each salesperson based on at least one of the activity management information and the sales negotiation item information, registered in a database that stores activity management information concerning activity content of each salesperson and sales negotiation item information concerning each sales negotiation item that each salesperson is in charge of;

a step of generating evaluation report information concerning the activity content of each salesperson, based on the evaluation results by the activity content evaluation unit; and a step of sending the generated evaluation report information to a terminal device of a salesperson.

BRIEF DESCRIPTION OF THE DRAWINGS

These objects and other objects and advantages of the present invention will become more apparent upon reading of the following detailed description and the accompanying drawings in which:

FIG. 5 is a diagram showing an example of a sales negotiation item list registered in an activity management information DB;

FIG. 6 is a diagram showing an example of a data structure of evaluation report information;

FIG. 7 is a diagram showing another example of a data structure evaluation report information;

FIG. 9 is a flowchart for describing knowledge information sending processing.

DETAILED DESCRIPTION OF THE PREFERRED EMBODIMENTS

Embodiments of the present invention will be described with reference to the drawings.

Figure 1:
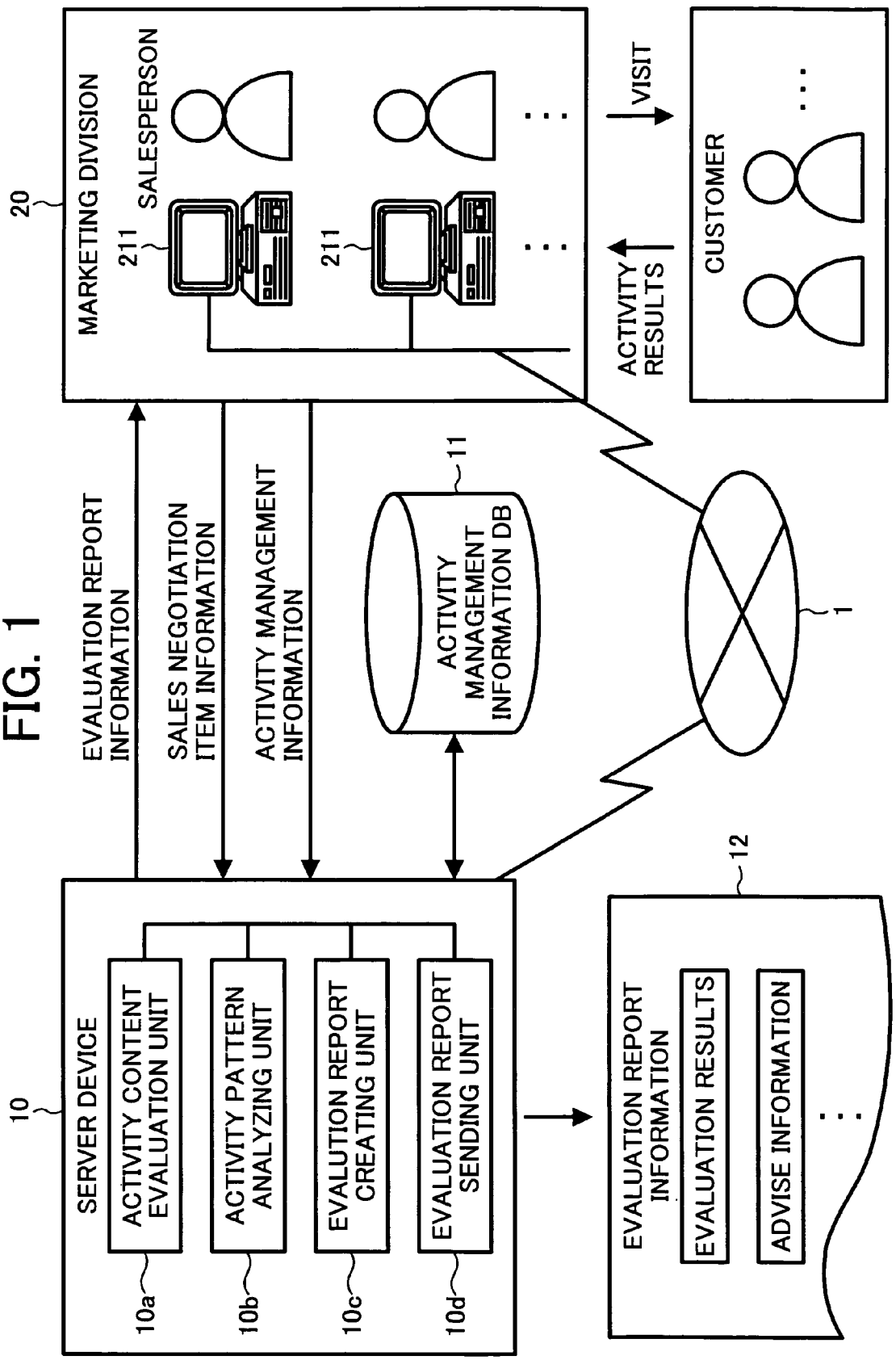
FIG. 1 is a diagram for describing an example of a structure of a sales activity management system according to the first embodiment of the present invention.

FIG. 1 is a diagram for describing a structure of a sales activity management system according to a first embodiment. The sales activity management system comprises a server device 10, an activity management information DB (Data Base) 11, and terminal devices 21 (211, 212, . . . ), etc. The server device 10 has an activity content evaluation unit 10a, an activity pattern analyzing unit 10b, an evaluation report crating unit 10c, and an evaluation report sending unit 10d, and is connected to the activity management information DB 11. Activity management information for managing activity content of each salesperson is registered in the activity management information DB 11. The server device 10 creates evaluation report information 12 by a later described process. The terminal devices 21 are placed at marketing divisions 20, and are used by salespeople and managers of the salespeople. The server device 10 is connected to the terminal devices 21 via a network 1.

The connection form of the server device 10 and the activity management information DB 11 are arbitrary, and for example may be connected by the network 1, or the activity management information DB 11 may be physically included in the server device 10.

Figure 2:
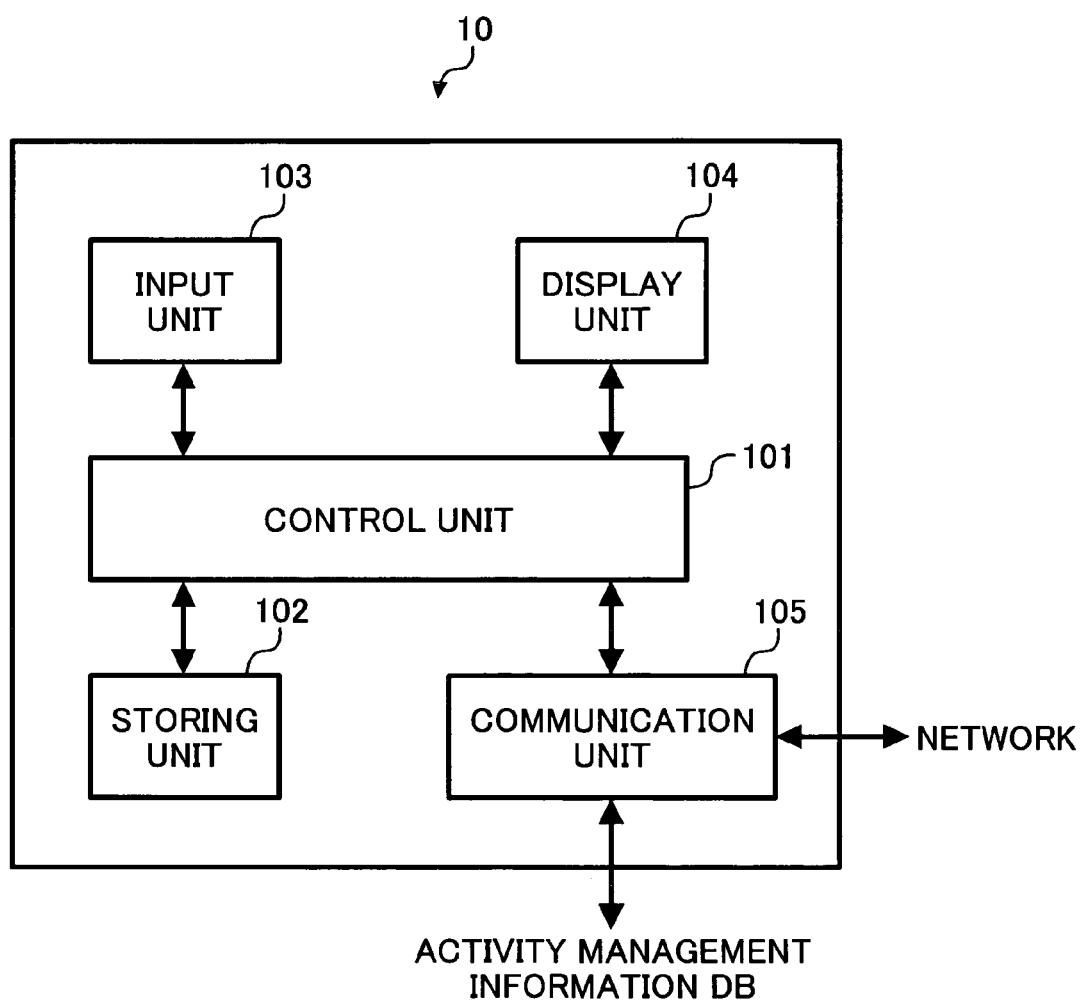
FIG. 2 is a diagram for describing hardware structure of a service device used in the sales activity management system shown in FIG. 1.

A hardware structure of the server device 10 is shown in FIG. 2. The server device 10 is constituted by a general-purpose computer that comprises a control unit 101, a storing unit 102, an input unit 103, a display unit 104, and a communication control unit 105, etc. The server device 10 may be connected to a recording medium reading/writing device, a network device for inputting data from another device, and a printing device, etc. The control unit 101 comprises a CPU (Central Processing Unit), a ROM (Read Only Memory), and a RAM (Random Access Memory), etc., and controls the entire server device 10. The control unit 101 logically actualizes the activity content evaluation unit 10$a$, the activity pattern analyzing unit 10$b$, the evaluation report creating unit 10$c$, and the evaluation report sending unit 10$d$, by reading operation programs, etc., pre-stored in the storing unit 102, and executing them. The storing unit 102 comprises hard disk devices, etc. The storing unit 102 stores operation programs for the control unit 101 to execute, and various data, etc., necessary for processing. The input unit 103 comprises a keyboard, and an input device such as a pointing device, etc., and sends the input data to the control unit 101. The display unit 104 comprises a display device, such as a CRT, or a liquid crystal display, etc., and outputs various screens, etc., in accordance with instructions from the control unit 101. The communication control unit 105 carries out communication with the terminal device 21, etc., via the network 1, in accordance with the instructions from the control unit 101.

The sales activity management system of the present invention is designed so that it can analyze the activity content of each salesperson, and create evaluation report information 12 including analysis results (hereinafter referred to as evaluation results) and advise information for advising for example, what kind of activity is presently not enough and what kind of activity should be carried out from here on, and notify the evaluation report information to each salesperson. The evaluation report information 12 is created based on for example, activity content (activity pattern) in a successful case of a sales negotiation by a salesperson with high business performance. Therefore, by the salesperson acting in accordance with the evaluation report information 12, a high level sales activity can be carried out effectively, without being effected by the skill level of a manager.

Activity management information for managing activity content of salespeople, and sales negotiation item information concerning each sales negotiation item that a salesperson is in charge of, are each registered correlated with information that identifies each salesperson (for example, representative ID, etc.) in the activity management information DB 11. The activity management information includes data such as number of registered sales negotiations of each salesperson, number of customer calls made, hours of activity, number of agreements reached in sales negotiations (or rate of agreements reached in sales negotiations), sales proceeds, and estimated sales proceeds, etc. The sales negotiation item information includes data such as, item name, customer name, and sales negotiation content (name of product, unit cost, amount, etc.,) concerning each sales negotiation, activity record concerning each item (when and what kind of activity is carried out, etc.,), and sales negotiation progress level, etc., indicating progress of a later described sales negotiation. Data items constituting the activity management information and the sale negotiation item information are not limited to the above, and data items for the activity management information may be set from various aspects, such as for example, number of delayed sales negotiations, which are sales negotiations that are delayed from an original plan, number of stalled sales negotiations, which are sales negotiations that do not progress even after a certain period has passed, and sales negotiation activity rate, etc.

The activity content evaluation unit 10$a$ carries out processing of evaluating activity content of each salesperson, based on activity management information registered in the activity management information DB 11. An example of a concrete evaluation method evaluates activity content by for example, comparing each data of the activity management information with a predetermined standard value and determining whether the value is more or less than the standard value. At this time, a combination of each data of the activity management information (for example, number of registered sales negotiations and number of customer calls made) may be evaluated. In this case, a comparison is made concerning, for example, the number of registered sales negotiations and the number of customer calls made, with the standard values thereof, and in a case where the number of registered sales negotiations is smaller than the standard value thereof and the number of customer calls made is larger than the standard value thereof, it may be determined that the number of registered sales negotiations is small, considering that the number of customer calls made is large. By this, evaluation based on the relationship between each data that constitutes the activity management information can be possible.

The activity pattern analyzing unit 10$b$ specifies activity management information wherein predetermined data items (for example, number of registered sales negotiations, number of agreements reached in sales negotiation, and sales proceeds, etc.,) that are set beforehand, have a value equal to or more than a predetermined value, in the activity management information registered in the activity management information DB 11, and carries out processing for analyzing activity patterns of a salesperson in the activity management information. Criterion of judgment is arbitrary, and may be determined by sales proceeds (or estimated sales proceeds) during a predetermined period, or profit amount (rate), etc. An activity pattern is data indicating what kind of action towards a customer is taken, in for example, a process of activity from occurrence of sales negotiation to agreement reached in the sales negotiation. Concretely, the activity pattern analyzing unit 10$b$ extracts according to each data, from for example the activity management information DB 11, activity management information equal to or more than a predetermined value that is set beforehand, concerning each data of the number of registered sales negotiations, the number of agreements reached in sales negotiations, and sales proceeds, etc. Then, the activity pattern analyzing unit 10$b$ specifies a representative ID correlated with the extracted activity management information, specifies items of sales negotiations that are established, from the sales negotiation item information corresponding to the representative ID, and respectively reads the activity record in the sales negotiation item information. Then, for example, the activity pattern analyzing unit 10$b$ extracts activity content that is common to each activity record that is read, and generates an activity pattern by combining the extracted activity contents. For example, the data item, "number of registered sales negotiations" will be described. The activity pattern analyzing unit 10$b$ extracts activity management information wherein the value of the number of registered sales negotiation is equal to or more than a predetermine value (for example 20, etc.,), specifies sales negotiation item information wherein the value of the data item, "sales negotiation progress level" indicates "acceptance of order", from the sales negotiation item information corresponding to the salesperson ID, which is correlated to each of the extracted activity management information, and reads data content of the activity record in the specified sales negotiation item information. Then, the activity pattern analyzing unit 10b extracts common activity content in each read activity record (for example, phoning customer representatives, sending questionnaires, making customer calls, sending source material, . . . ), and generates an activity pattern corresponding to the data item "number of registered sales negotiations", combining the extracted activity content.

The evaluation report creating unit 10c generates advise information based on evaluation results by the activity content evaluation unit 10a, and the activity pattern generated by the activity pattern analyzing unit 10b, and carries out processing for creating evaluation report information 12, which includes the evaluation results and advise information. The advise information is for accurately instructing what kind of sales activity should be carried out from hereon, towards the weak point of each salesperson. In generating the advise information, for example, advise message can be stored in the storing unit 102, according to predetermined data items (number of registered sales negotiations, number of agreements reached in sales negotiations, and sales proceeds, etc.,), and in the evaluation result of each data item, in a case where the value is smaller than the standard value, the advise message for that data item may be read from the storing unit 102, and the evaluation report information 12, including the advise message and the activity pattern concerning the data item may be generated.

The evaluation report creating unit 10c may carry out ranking of the activity content of each salesperson, based on evaluation results by the activity content evaluation unit 10a. Concretely, the ranking may be determined in accordance with the difference in value of each data item in the activity management information, which is an evaluation target, and a standard value. Data of this ranking may be added to the evaluation report information 12, and by this, each salesperson can comprehend which part is his/her weak point in sales activity.

The evaluation report creating unit 10c obtains representative ID correlated with evaluation target data, together with evaluation results from the activity content evaluation unit 10a, and stores the generated evaluation report information 12, correlating it to the representative ID thereof, to the storing unit 102.

The evaluation report sending unit 10d sends the evaluation report information 12 created by the evaluation report creating unit 10c to the terminal device 21. For example, an evaluation report demand designating a representative ID, etc., may be received from the terminal device 21, and the evaluation report information 12 corresponding to that representative ID may be read from the storing unit 102 and sent. Or, the server device 10 may generate evaluation report information 12 at a certain cycle, refer to address information wherein representative ID and e-mail address of each salesperson are registered correlated, and send each generated evaluation report information by e-mail to the e-mail address that corresponds to the representative ID.

The advise information may be generated in accordance with any of the items such as for example, number of registered sales negotiations, number of customer calls made, hours of activity, number of agreements reached in sales negotiations, rate of agreements reached in sales negotiations, sales proceeds, and estimated sales proceeds, in the activity management information registered in the activity management information DB 11. The advise information may be generated by whichever of a plurality of combinations of the above activity management information (for example, number of registered sales negotiations and number of customer calls made). By this, because advise information can be generated based on various aspects towards the activity content, salespeople can carry out sales activities more effectively.

The control unit 101 receives sales activity results based on evaluation report information from each sales representative, and information concerning sales activity content from the terminal device 21, and stores/updates activity management information and sales negotiation item information corresponding to the received information, in the activity management information DB 11. The control unit 101 may receive for example, data such as sales negotiation management information, and sales negotiation item information, etc., together with representative ID from the terminal device 21, and store the data to the activity management information DB 11. Or, the control unit 101 may receive for example, sales negotiation item information from the terminal device 21, store it in the activity management information DB 11, and update activity management information based on registered content of the sales negotiation item information. For example, in a case where sales negotiation item information for a new sales negotiation is received from the terminal device 21, and registered in the activity management information DB 11, the control unit 101 may add just 1 to the number of registered sales negotiations in the activity management information corresponding to that representative ID.

The terminal device 21 consists of a general purpose computer that comprises a control unit (including a CPU, a RAM, and a ROM, etc,), a storing unit (including HDD), an input unit (including a keyboard, and a mouse), a display unit (including a CRT, and a liquid crystal display), and a communication control unit, etc. The control unit of the terminal device 21 connects to the server device 10 by reading and executing an operation program, etc., pre-stored in the storing unit, and carries out processing of, receiving evaluation report information 12 of a salesperson, storing the information 12 to the storing unit, and displaying the information 12 to the display unit. The terminal device 21 may be connected to a recording medium reading/writing device, a network apparatus for inputting data from other apparatuses, and a printing device, etc.

According to the present invention, because instructions and advise concerning sales activity can be accurately carried out towards each salesperson, without being effected by the skill level of the manager, an effective management becomes possible.

Because each salesperson can recognize his/her own weak point in sales activity, and receive instructions and advise concerning sales activity, based on activity patterns of salespeople with high business performances, an effective sales activity can be carried out.

Figure 3:
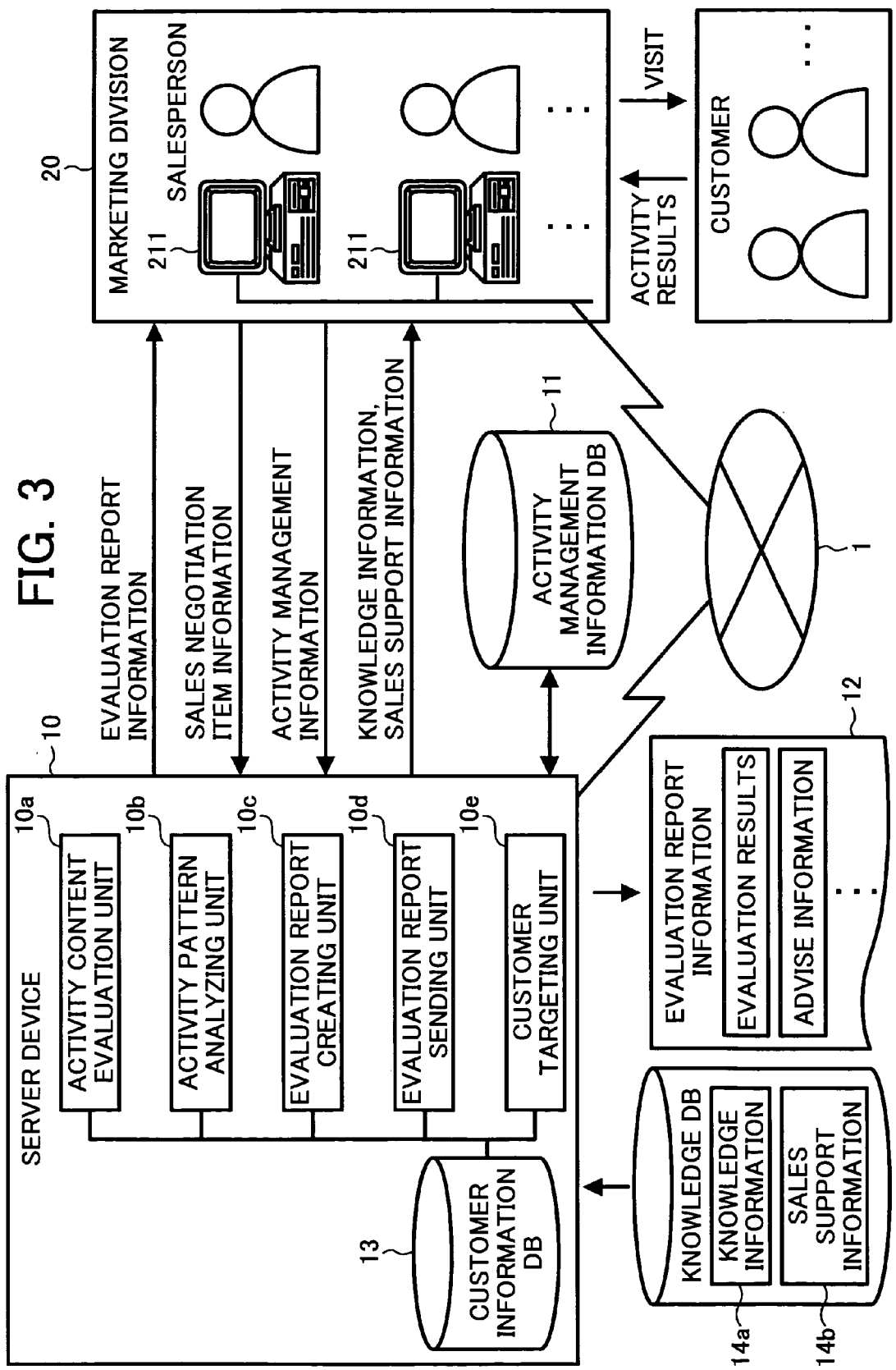
FIG. 3 is a diagram for describing an example of a structure of a sales activity management system according to the second embodiment of the present invention.

FIG. 3 is a diagram for describing a structure example of a sales activity management system according to a second embodiment of the present invention. A server device 10 in the present embodiment comprises an activity content evaluation unit 10a, an activity pattern analyzing unit 10b, an evaluation report creating unit 10c, an evaluation report sending unit 10d, a customer targeting unit 10e, and a customer information DB 13 that stores information concerning customers registered. The server device 10 is connected to a knowledge DB 14. The points in that the system structure of the present embodiment differs with the system structure shown in FIG. 1, is that the present embodiment has a knowledge DB 14, and that the server device 10 comprises a customer targeting unit 10e and a customer information DB 13.

Because other structural elements are the same as the first embodiment shown in FIG. 1, the descriptions for the overlapping parts will be omitted. The server device 10 of the second embodiment is drawn so that it physically includes the customer information DB 13. However, it is not limited to this, and the server device 10 may be structured so that it is connected to the customer information DB 13 via a network, etc.

Customer information is registered in the customer information DB 13. Customer information includes data such as for example, customer ID, customer name, address, telephone number, and representative of the customer side, etc. Knowledge information 14a and sales support information 14b are registered correlated to customer information (customer ID) registered in the customer information DB 13. The knowledge information 14a includes data such as know-how and knowledge in sales activity, concerning each customer. The sales support information 14b includes various promotional material, sales activity records (for example, a winning pattern or proposal contents in past sales negotiations), and data of delivery achievement concerning apparatuses.

The customer targeting unit 10e refers to the sales negotiation item information in the activity management information DB 11, concerning each salesperson, and carries out processing of setting sales negotiation customers having a sales negotiation progress level equal to or of a higher level than a predetermined level, as targets. Then, information concerning customers set as targets may be read from the customer information DB 13, and added to the evaluation report information 12.

The control unit 101 reads knowledge information 14a and sales support information 14b from the knowledge DB 14, concerning a customer targeted by the customer targeting unit 10e, when sending the evaluation report information 12 to the terminal device 21, and sends them to the terminal device 21. Here, the sales support information 14b may include for example, catalogues, fliers, and source data (tools) used in various sales activities such as proposals, etc. The control unit 101 may send the evaluation report information 12, the knowledge information 14a, and the sales support information 14b, etc., to a manager of a salesperson also. In this case, manager address information which has a representative ID of each salesperson and mail address of the manager of the salesperson correlated, is stored in the storing unit 102, and the control unit 101 may refer to the address information of the manager, obtain the mail address of the manager that corresponds to the representative ID of the salesperson, and send various data by e-mail to this mail address.

The control unit 101 may also receive results of sales activities carried out towards customers based on the sent evaluation report information 12, as activity management information from the terminal device 21 that the salesperson uses, and register the received activity management information in the activity management information DB 11.

According to the present invention, because useful knowledge information and sales support information in making customer calls are sent to the salesperson, the salesperson can effectively and efficiently carry out sales activity based on these information. Irrelevant calls by the salesperson's assumptions can be eliminated, and improvement in customer satisfaction can be provided.

By the provided customer information, etc., calling content becomes clear, and because information and tools in line with the content are sent to the salesperson, a more accurate calling can be carried out towards the customer.

By receiving results of sales activity carried out based on the evaluation report, as activity management information, from the terminal device 21 used by the salesperson, and registering the received activity management information, effects due to the advise information in the evaluation report can be confirmed.

Figure 4:
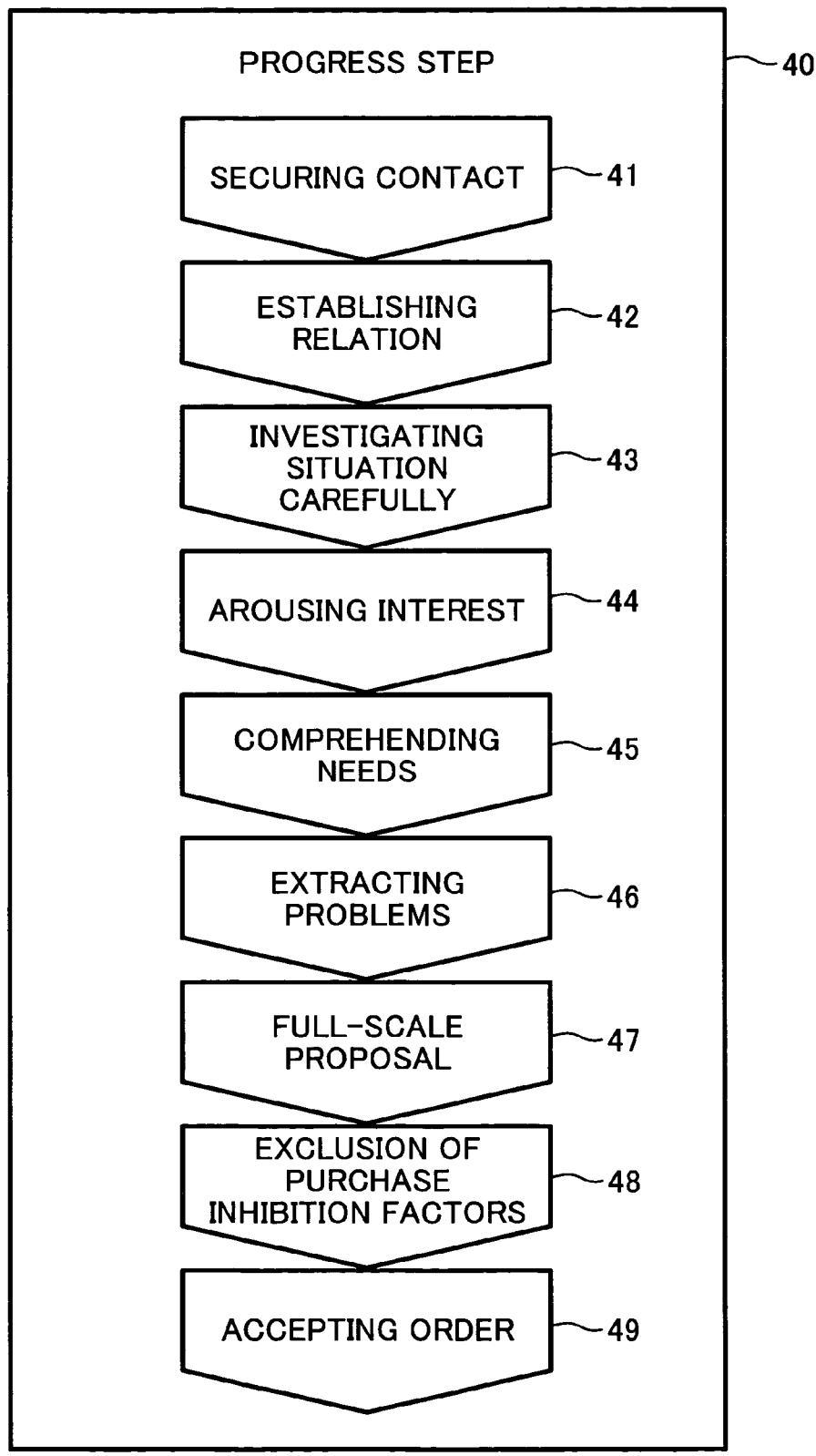
FIG. 4 is a diagram for describing progress steps set in accordance with progress of a sales negotiation, concerning each sales negotiation.

FIG. 4 is a diagram showing an example of steps corresponding to sales negotiation progress level (progress step) set in each sales negotiation, in accordance with the progress of the sales negotiation. A progress step 40 comprises for example, nine steps of, securing contact 41, establishing relation 42, investigating situation carefully 43, arousing interests 44, comprehending needs 45, extracting problems 46, full-scale proposal 47, exclusion of purchase inhibition factors 48, and accepting orders 49. By classifying the situation of sales negotiations in this kind of progress step, it is possible to intuitively grasp the progress of the sales negotiation. In the sales negotiation item information in the activity management information DB 11 in the first and second embodiments, steps indicating the progress of the sales negotiation of that item are set as the sales negotiation progress level.

Here, the securing contact 41 is a step of aiming for a first contact with a customer, such as a first call to a new customer, etc., the establishing relation 42 is a step of aiming for establishing relation with the customer, such as trying to get to know the faces of staff in a major section or sales and marketing section of the customer, etc., and the investigating situation carefully 43 is a step of investigating items that are estimated to influence a success or failure of a contract, or conditions, such as, existing apparatuses that the customer has, and competing companies, etc.

The arousing interest 44 is a step for arousing the customer's desires, the comprehending needs 45 is a step of comprehending the content of products, etc., that the customer is seeking, and the extracting problems 46 is a step of searching problems that must be solved to realize providing of products, etc., that the customer is seeking.

The full-sale proposal 47 is a step for proposing contracts for providing the product, etc., that the customer is seeking, the exclusion of purchase inhibition factors 48 is a step for eliminating factors that prevent the contract from being signed, and the accepting orders 49 is a step for establishing contracts according to the deal. In the progress step 40, the sales negotiation progresses as the steps forwards in the order of the securing contact 41, the establishing relation 42, the investigating situation carefully 43, the arousing interest 44, the comprehending needs 45, the extracting problems 46, the full-scale proposal 47, the exclusion of purchase inhibition factors 48, and the accepting orders 49.

The control unit 101 may carry out processing for generating a list of the situation of the sales negotiation items (sales negotiation item list), using the activity management information and the sales negotiation item information registered in the activity management information DB 11. Concretely, the control unit 101 counts the total number of items for each department, and the number of items in each sales negotiation progress level for each department, concerning sales negotiation item information registered in the activity management information DB 11. Here, the sales negotiation item information may further include attribute information (for example, department code) that specifies a department that the salesperson belongs to. Then, the control unit 101 calculates the number of items per one salesperson, by dividing both the total number of items for each department and the number of items in each sales negotiation progress level for each department, by the number of salespeople in each department, etc. The sales negotiation item information further includes information indicating whether the salesperson created a product specification (product configuration document) concerning that item, and the control unit 101 counts the number of product specifications created. Then, the ratio of the number of items of product specifications created in each department, to the total number of items for each department (product specification creating rate) may be calculated. The sales negotiation information further includes information indicating whether the salesperson created a written estimate (indicating estimates for the product structure shown in the specification) concerning that item, and the control unit 101 counts the number of written estimates created. Then, the ratio of the number of items of written estimates created in each department, to the total number of items for each department (written estimate creating rate) may be calculated. For example, the activity record information in the sales negotiation item information further includes information of activity time, and the control unit 101 calculates the total number of activity days, and time during a predetermined period, based on the activity record information, for each department, and calculates activity time per day, by dividing the total number of activity time by the total activity days. Then, the control unit 101 generates a sales negotiation item list indicating various data of the above, and stores it in the activity management information DB 11. In a case where the control unit 101 receives a request for the sales negotiation item list from the terminal device 21, the control unit 101 reads the data of the sales negotiation item list from the activity management information DB 11, and sends the data to the requested terminal device 21. In a case where a display demand of the sales negotiation item list is input from the input unit 103, the control unit 101 may read data of the sales negotiation item list from the activity management information DB 11, and display it to the display unit 104. It may be done by the input unit 103, and displayed to the display unit 104.

FIG. 5 shows an example of a sale negotiation item list 50 generated by the control unit 101. The sales negotiation item list 50 includes each data item of for example, sales company name 51, department name 52, number of salespeople 53, number of registered items 54, product specification information 55, written estimate information 56, and activity time information 57. Here, the number of registered items 54, indicates the total number of every item that is ongoing, and number of registered items, etc., according to the sales negotiation progress level. The product specification information 55 indicates the product specification creating rate for each department. The product specification creating rate can be calculated according to each sales negotiation progress level, and displayed. The ratio of the number of items that has the product specification created according to each department to the number of sales negotiation items of the entire company, may be calculated as the product specification creating rate. The written estimate information 56 indicates the written estimate creating rate according to each department. The written estimate creating rate may be calculated according to the sales negotiation progress level, and displayed. The ratio of the number of items that has the written estimate created according to each department, to the number of sales negotiation items of the entire company instead of according to each department, may be calculated as the product specification creating rate. The activity time information 57 is an item that indicates the activity time per day in an arbitrary determined period (for example, five days from Jan. 28, 2002 to Feb. 1, 2002). The activity time information 57 may be calculated divided into for example, time required for sales negotiation activity, time required for activities other than sales negotiation, time required for activities other than meeting customers, time required for transferring, and time required for recess, and displayed.

FIG. 6 is a diagram showing an example of a structure of evaluation report information. The evaluation report information includes for example, classification of information 61, ranking 62, evaluation results 63, advise information 64, and customer information 65. The evaluation report information in FIG. 6 shows an example of a case where evaluation of activity content concerning items such as "number of registered sales negotiations" is carried out. In the evaluation results 63, a message of evaluation results, such as "the number of sales negotiations registered is too small", etc., is displayed. This shows a determination result in a case where for example, a set value of standard value of the number of registered sales negotiations in a predetermined period is "7" and the registered number is "5". In the ranking 62, "B" is displayed as an evaluation rank. This is displayed for a case where the ranking is carried out in three steps of for example, A, B, and C. The standard for ranking can be arbitrary set. In the advise information 64, a message, "Actively carry out arousing interests when making customer calls, and develop to sales negotiation. Concrete activity pattern is . . . " is displayed. The advise information 64 is generated by analyzing activity patterns of salespeople who have high business accomplishments. Each salesperson can go forward with sales negotiations based on the advise information 64 of the evaluation report information.

The customer information 65 is information which extracts customers having a level equal to or higher than a predetermined sales negotiation level (in the present example, a sales negotiation level equal to or higher than 7), from the customer information DB 13, as priority customers. By this, salespeople can confirm information concerning the customer that he/she should visit, and at the same time, can effectively carry out sales negotiations towards the customer of the customer information 65, using the above advise information.

FIG. 7 is a diagram showing another example of the structure of the evaluation report information. The evaluation report information shown in this example further includes a comment space 66 by a manager. In this case, evaluation report information is sent to a terminal device 21 used by the manager from the server device 10. The manager checks the evaluation report information, and inputs advise information and comments, etc., if he/she has any, towards the sales person, in the manager comment space 66, from the terminal device 21. Thereafter, the terminal device 21 sends the evaluation report information including the input data to the server device 10, in accordance with the manager's operation, and the server device 10 sends the evaluation report information to the terminal device 21 used by the salesperson. By this, because the salesperson can obtain a comment from his/her boss, in addition to the advise information, sales activity of a higher level can be carried out. By the manager inputting a comment, and carrying out a predetermined operation, such as pressing a send button, the terminal device 21 of the manager may send the comment directly to the terminal device 21 of the salesperson without the use of the server device 10. In this case, evaluation report information may be sent using an e-mail address of the salesperson added in the evaluation report information, in accordance with the operation of the manager, or automatically by the terminal device.

Figure 8:
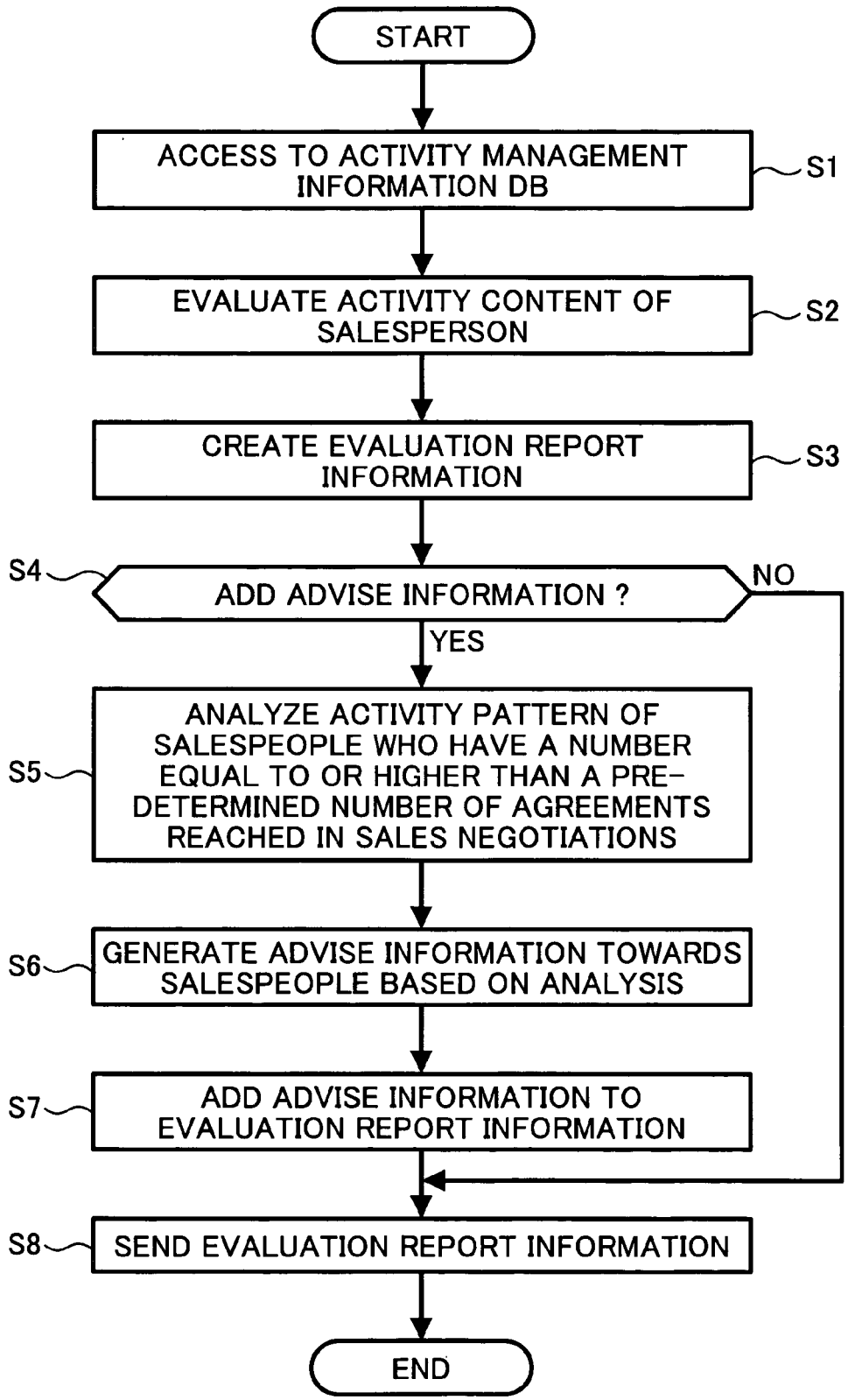
FIG. 8 is a flowchart for describing evaluation report sending processing.

Evaluation report sending processing where the server device 10 sends evaluation report information to the salesperson, will be described with reference to the flowchart in FIG. 8.

First, the control unit 101 of the server device 10 accesses to the activity management information DB 11 (Step S1), and evaluates activity content of the salesperson (Step S2) based on activity management information and sales negotiation item information, etc., registered in the activity management information DB 11. The activity management information includes for example, number of registered sales negotiations, number of customer calls made, hours of activity, number of agreements reached in sales negotiations (rate of agreements reached in sales negotiations), sales proceeds, and estimate proceeds of each salesperson. Next, the control unit 101 creates evaluation report information 12 concerning activity content of the salesperson, based on the evaluation results (Step S3). The control unit 101 determines whether to add advise information to the evaluation report information 12 after creating the evaluation report information 12 in Step S3 (Step S4). This determination can be carried out by referring to for example, data content (whether to add advise information to the evaluation report information) set in the storing unit 102. In a case where it is determined to add the advise information to the evaluation report information 12 (YES), the control unit 101 analyzes the activity pattern of salespeople indicating a number (or rate) equal to or higher than a predetermined number of agreements reached in sales negotiations (or rate of agreements reached in sales negotiations), using the data registered in the activity management information DB 11, and stores the results to the storing unit 102 (Step S5). The control unit 101 generates advise information concerning activity content of a salesperson based on the analysis (Step S6), adds the generated advise information to the evaluation report information 12 (Step S7), sends the evaluation report information 12 to a terminal device that is used by the salesperson (Step S8), and ends the processing. In a case where it is determined not to add the advise information to the evaluation report 12 in Step S4 (NO), the flow moves to Step S8.

Next, knowledge information sending processing wherein the server device 10 sends knowledge information, etc., to the salesperson will be described with reference to the flowchart in FIG. 9.

First, the control unit 101 of the server device 10 refers to the sales negotiation item information stored in the activity management information DB 11, specifies information wherein the sales negotiation progress level is equal to or higher than a predetermined level, and targets the customers in that sales negotiation (Step S11). Then, the control unit 101 reads customer information, etc., concerning the targeted customer from the customer DB 13, etc. Then, the control unit 101 adds customer information etc., to the evaluation report information 12 generated by the processing indicated in steps S1 to S7, of the above evaluation report sending processing (Step S12), and sends the information to the terminal device of the salesperson (Step S13).

Next, the control unit 101 determines whether to send the knowledge information to the terminal device 21 (Step S14). This determination may be carried out by referring to for example data content (whether to send the knowledge information to the terminal device 21) set in the storing unit 102. In a case where it is determined to send the knowledge information to the terminal device 21 (YES), knowledge information relating to the customer targeted in step S11, is extracted from the knowledge DB 14 (Step S15).

Then, the control unit 101 determines whether to send the sales support information to the terminal device 21 (Step S16). This determination may be carried out by referring to for example data content (whether to send the sales support information to the terminal device 21) set in the storing unit 102. In a case where it is determined to send the sales support information to the terminal device 21 (YES), the sales support information relating to the customer targeted in step S11, is extracted from the knowledge DB 14 (Step S17). The control unit 101 determines whether it has extracted at least one of the knowledge information and the sales support information (Step S18). In a case where at least either is extracted (YES), the extracted knowledge information and/or the sales support information is sent to the terminal device 21 (Step S19), and the processing ends.

In a case where it is determined that knowledge information is not sent to the terminal device 21 in Step S14 (NO), the flow moves to Step S16.

In Step S16, in a case where it is determined not to send the sales support information to the terminal device 21, (NO), the flow moves to Step S18.

In Step S18, in a case where it is determined that neither the knowledge information nor the sales support information is extracted, (NO), the processing ends.

In the flowchart in FIG. 9, it is determined whether to send the knowledge information and the sales support information. However, the knowledge information and the sales support information may be sent without carrying out this kind of determining processing.

It is preferable that the programs stored in the storing unit 102 of the server device 10 and the storing unit of the terminal device 21 are programs using GUI (Graphical User Interface) so that operation is easy when the users use each device. Places to set the server device 10 is not limited to for example system management departments of companies, etc., and can be placed in outside service providing companies, etc. An embodiment using an outside rental server is also possible. Further, as operation embodiments of the present sales activity management system, various operation embodiments are possible, such as for example, independent operation by a company, or operation by outside service providing companies, etc.

In describing each embodiment of the present invention, the server device 10 is shown as one device. However, each function of the server 10 may be dispersed to for example, other server devices and terminal devices, via a network. Each terminal device may be a desktop personal computer, a mobile computer that can be connected to a network, or a mobile phone, as long as the form is in accordance with the form of usage. In a case where a plurality of terminals that can be used in the present sales activity management system are set, the terminals may be network connected by for example, LAN, etc.

The network 1 is not limited to being wired or being wireless, and may be a dedicated line, the Internet connected by a phone line, etc., or the Intranet using Internet technology, and may be constituted by a WAN (Wide Area Network), a MAN (Metropolitan Area Network), or a LAN (Local Area Network). It is preferable that technology for enhancing various security such as, usage of a dedicated line, encryption of data transfer, and certification of a user using each terminal device, etc., is used for this network.

Above, each function in the sales activity management system of the present invention is mainly described in each embodiment. However, the present invention can have an embodiment as a sales activity management method, as described as a method for carrying out in each step in the sales activity management system. In the same way as the sales activity management system that has each of these functions, an embodiment as a recording medium which records a program for functioning a computer as a sales activity management system, is possible.

A recording medium which stores a program and data for realizing functions of the sales activity management of the present invention, may concretely use a CD-ROM (-R/-RW), a magnet-optical disk, a DVD-ROM, a FD, a flash memory, a memory card, a memory stick, or various ROM or RAM, etc., as the recording medium. The present invention may comprise a server device 10 and a terminal device 21, etc., that executes the above processing by distributing the recording medium, and installing the program, etc., to the computer. The above program data may be stored in a disk device or the like included in the server device on the Internet, and embedded in a carrier wave, or may be downloaded, etc., into the computer.

In a case where the above function is realized, etc., by the OS distributing, or by the combination of the OS and the application, parts other than the OS may be stored to the medium and distributed, or may be downloaded, etc., to the computer, being embedded in a carrier wave.

According to the present invention, because instructions and advise concerning sales activity can be accurately carried out towards each salesperson, without being effected by a skill level of a manager, effective management can be carried out. In the sales activity, because knowledge information and sales support information useful in making calls to customers are sent together with the evaluation report information that evaluates the activity content, salespeople can carry out sales activity efficiently and effectively based on these information. As a result, improvement in customer satisfaction can be carried out by eliminating irrelevant calls made by the salesperson's assumptions.

Various embodiments and changes may be made there onto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-93245 filed on Mar. 31, 2003, Japanese Patent Application No. 2004-98691 filed on Mar. 30, 2004 and including specification, claims, drawings and summary. The disclosure of the above Japanese Patent Application is incorporated herein by reference in its entirety.

What is claimed is:

1. A computer-implemented sales activity management system comprising:
    a database implemented by the computer that stores activity management information concerning activity content of each salesperson and sales negotiation item information concerning each sales negotiation item that each salesperson is in charge of, wherein a sales negotiation item is an item identifying a sales negotiation which a salesperson conducts with a customer, and the sales negotiation item information includes at least a customer identifier for identifying the customer and information of sales negotiation progress level indicating progress of the sales negotiation;
    an activity content evaluation unit implemented by the computer that evaluates the activity content of each salesperson based on at least one of the activity management information and the sales negotiation item information, registered in said database;
    an evaluation report document information creating unit implemented by the computer that generates, for each salesperson, an evaluation report document information including evaluation report information concerning the activity content of a salesperson, based on the evaluation results by said activity content evaluation unit;
    a customer database implemented by the computer that stores customer information concerning customers;
    a customer targeting unit implemented by the computer that extracts sales negotiation item information wherein a sales negotiation progress level of the sales negotiation item is equal to or greater than a predetermined level among a plurality of sales negotiation items that are in progress by a salesperson from the database, targets the customer identified by a customer identifier included in the extracted sales negotiation item information, extracts the customer information of the targeted customer from the customer database, and adds the extracted customer information as priority customer information for the salesperson to said evaluation report information in the evaluation report document information of the salesperson;
    an evaluation report document information sending unit implemented by the computer that sends, for each salesperson, the generated evaluation report document information of the salesperson including the customer information added by the customer targeting unit and the evaluation report information, to a terminal device of the salesperson connected to the sales activity management system through a communication network; and
    a knowledge database implemented by the computer that stores at least one of knowledge information concerning know-how and knowledge in sales activity and sales support information including at least one data of various promotional material, sales activity record, and delivery achievement concerning apparatuses, for using in sales activity, correlating the at least one data with customer information registered in the customer database, wherein
    said customer targeting unit extracts at least one of knowledge information and sales support information relating to the targeted customer from the knowledge database and sends the information to said terminal device, when sending the evaluation report document information to said terminal device and the evaluation report document information creating unit generating advice information for advising the salesperson.

2. The sales activity management system according to claim 1, wherein the activity management information includes one of, or a plurality of data of, number of registered sales negotiations, number of customer calls made, hours of activity, number of agreements reached in sales negotiations, rate of agreements reached in sales negotiations, sales proceeds, and estimate proceeds.

3. The sales activity management system according to claim 1, further comprising an activity pattern analyzing unit that extracts sales management information that has a number or rate equal to or greater than a predetermined number of registered sales negotiations or a predetermined rate of registered sales negotiations from said database, and analyzes the activity pattern of the salesperson, using the extracted sales management information, wherein:
    said evaluation report document information creating unit generates advice information towards the activity content of each salesperson based on the analysis by said activity pattern analyzing unit, and adds the generated advice information to the evaluation report information in the evaluation report document information.

4. The sales activity management system according to claim 3, wherein said advice information includes activity instruction information towards each salesperson.

5. The sales activity management system according to claim 3, wherein said activity pattern analyzing unit extracts sales management information wherein a sales proceed or an estimate proceed is greater than a predetermined amount, from said database, and analyzes the activity pattern of the salesperson using the extracted sales management information.

6. The sales activity management system according to claim 1, wherein the evaluation report document information creating unit ranks the activity content of each salesperson, based on the evaluation results by the activity content evaluation unit.

7. The sales activity management system according to claim 1, which receives information concerning results of sales activity carried out based on said evaluation report document information, from said terminal device, and registers at least one of the activity management information and the sales negotiation item information, which are based on the received information, to said activity management information database.

8. The sales activity management system according to claim 1, wherein said evaluation report document information further includes data of comments input by a manager of said each salesperson.

9. A computer-implemented server device comprising:
an activity content evaluation unit implemented by the computer that evaluates activity content of each salesperson based on at least one of activity management information and sales negotiation item information, registered in a database that stores the activity management information concerning the activity content of each salesperson and the sales negotiation item information concerning each sales negotiation item that each salesperson is in charge of, wherein a sales negotiation item is an item identifying a sales negotiation which a salesperson conducts with a customer, and the sales negotiation item information includes at least a customer identifier for identifying the customer and information of sales negotiation progress level indicating progress of the sales negotiation;
an evaluation report document information creating unit implemented by the computer that generates, for each salesperson, an evaluation report document information including evaluation report information concerning the activity content of a salesperson, based on the evaluation results by said activity content evaluation unit;
a customer targeting unit implemented by the computer that extracts sales negotiation item information wherein a sales negotiation progress level of the sales negotiation item is equal to or greater than a predetermined level among a plurality of sales negotiation items that are in progress by a salesperson from the database, targets the customer identified by a customer identifier included in the extracted sales negotiation item information, extracts customer information of the targeted customer from a customer database that stores customer information concerning customers, and adds the extracted customer information as priority customer information for the salesperson to said evaluation report information in the evaluation report document information of the salesperson;
an evaluation report document information sending unit implemented by the computer that sends, for each salesperson, the generated evaluation report document information of the salesperson including the customer information added by the customer targeting unit and the evaluation report information, to a terminal device of the salesperson connected to the server device through a communication network; and a knowledge database implemented by the computer that stores at least one of knowledge information concerning know-how and knowledge in sales activity and sales support information including at least one data of various promotional material, sales activity record, and delivery achievement concerning apparatuses, for using in sales activity, correlating the at least one data with customer information registered in the customer database, wherein
said customer targeting unit extracts at least one of knowledge information and sales support information relating to the targeted customer from the knowledge database and sends the information to said terminal device, when sending the evaluation report document information to said terminal device and the evaluation report document information creating unit generating advice information for advising the salesperson.

10. A non-transitory computer readable recording medium which stores a program controlling a computer to function as:
an activity content evaluation unit that evaluates activity content of each salesperson based on at least one of activity management information and sales negotiation item information, registered in a database that stores the activity management information concerning the activity content of each salesperson and the sales negotiation item information concerning each sales negotiation item that each salesperson is in charge of, wherein a sales negotiation item is an item identifying a sales negotiation which a salesperson conducts with a customer, and the sales negotiation item information includes at least a customer identifier for identifying the customer and information of sales negotiation progress level indicating progress of the sales negotiation;
an evaluation report document information creating unit that generates, for each salesperson, an evaluation report document information including evaluation report information concerning the activity content of a salesperson, based on the evaluation results by said activity content evaluation unit;
a customer targeting unit that extracts sales negotiation item information wherein a sales negotiation progress level of the sales negotiation item is equal to or greater than a predetermined level among a plurality of sales negotiation items that are in progress by a salesperson from the database, targets the customer identified by a customer identifier included in the extracted sales negotiation item information, extracts customer information of the targeted customer from a customer database that stores customer information concerning customers, and adds the extracted customer information of the targeted customer as priority customer information for the salesperson to said evaluation report information in the evaluation report document information of the salesperson;
an evaluation report document information sending unit that sends, for each salesperson, the generated evaluation report document information of the salesperson including the customer information added by the customer targeting unit and the evaluation report information, to a terminal device of a salesperson connected to the computer through a communication network; and
a knowledge database implemented by the computer that stores at least one of knowledge information concerning know-how and knowledge in sales activity and sales support information including at least one data of various promotional material, sales activity record, and delivery achievement concerning apparatuses, for using in sales activity, correlating the at least one data with customer information registered in the customer database, wherein said customer targeting unit extracts at least one of knowledge information and sales support information relating to the targeted customer from the knowledge database and sends the information to said terminal device, when sending the evaluation report document information to said terminal device and the evaluation report document information creating unit generating advice information for advising the salesperson.

* * * * *